(12) United States Patent
Mao

(10) Patent No.: US 11,742,741 B2
(45) Date of Patent: Aug. 29, 2023

(54) SPURIOUS NOISE REDUCTION BY MONOTONIC FREQUENCY STEPPING WITH COMPENSATION OF ERROR AMPLIFIER'S OUTPUT IN PEAK CURRENT MODE SWITCHING REGULATOR

(71) Applicant: Analog Devices International Unlimited Company, Limerick (IE)

(72) Inventor: Jingwen Mao, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 105 days.

(21) Appl. No.: 17/467,001

(22) Filed: Sep. 3, 2021

(65) Prior Publication Data
US 2022/0077780 A1   Mar. 10, 2022

Related U.S. Application Data

(60) Provisional application No. 63/075,667, filed on Sep. 8, 2020.

(51) Int. Cl.
*H02M 3/158* (2006.01)
*H02M 1/00* (2006.01)
*H02M 1/14* (2006.01)

(52) U.S. Cl.
CPC ......... *H02M 1/0025* (2021.05); *H02M 1/143* (2013.01); *H02M 3/158* (2013.01)

(58) Field of Classification Search
CPC ...... H02M 3/156; H02M 3/157; H02M 3/158; H02M 3/1588; H02M 1/0025; H02M 1/14; H02M 1/143; H02M 1/15
See application file for complete search history.

(56) References Cited

U.S. PATENT DOCUMENTS

| | | |
|---|---|---|
| 5,668,464 A | 9/1997 | Krein et al. |
| 5,929,692 A | 7/1999 | Carsten |
| 6,388,896 B1 | 5/2002 | Cuk |
| 6,437,999 B1 | 8/2002 | Wittenbreder |
| 7,233,130 B1 | 6/2007 | Kay |
| 7,514,910 B2 | 4/2009 | Nishida |
| 7,615,973 B2 | 11/2009 | Uehara |
| 7,706,161 B2 | 4/2010 | Quazi |

(Continued)

FOREIGN PATENT DOCUMENTS

| | | |
|---|---|---|
| CN | 1738189 A | 2/2006 |
| CN | 114421762 A | 4/2022 |

(Continued)

OTHER PUBLICATIONS

Hafeez, KT, et al., "Hybrid Structured Buck Converter with Ripple Cancellation and Improved Efficiency", 2013 Annual IEEE India Conference (INDICON), (2013), 5 pgs.

(Continued)

*Primary Examiner* — Alex Torres-Rivera
(74) *Attorney, Agent, or Firm* — Schwegman Lundberg & Woessner, P.A.

(57) ABSTRACT

Described herein is a switching regulator that can provide a high current while operating with low noise and low spur. The switching regulator may operate with a varying switching frequency. Spurs at the varying switching frequency may be reduced by compensating an error amplifier, which controls the switching frequency.

19 Claims, 3 Drawing Sheets

(56) References Cited

U.S. PATENT DOCUMENTS

| | | | |
|---|---|---|---|
| 8,145,149 | B2 | 3/2012 | Ramachandran et al. |
| RE43,414 | E | 5/2012 | Walters et al. |
| 8,421,432 | B2 | 4/2013 | Hawkes |
| 8,698,475 | B2 | 4/2014 | Dong et al. |
| 8,786,268 | B2 * | 7/2014 | Li ................... H02M 3/156 323/283 |
| 8,786,270 | B2 | 7/2014 | Wu et al. |
| 8,829,876 | B2 | 9/2014 | Michishita et al. |
| 8,922,186 | B2 | 12/2014 | Chen |
| 8,963,519 | B2 | 2/2015 | Zambetti et al. |
| 9,209,690 | B2 | 12/2015 | Srinivasan et al. |
| 9,225,231 | B2 | 12/2015 | Gorisse et al. |
| 9,252,659 | B2 | 2/2016 | Oki |
| 9,484,797 | B2 | 11/2016 | Khlat |
| 9,588,532 | B2 | 3/2017 | Rahimi et al. |
| 9,966,832 | B1 | 5/2018 | Engelhardt et al. |
| 2009/0128110 | A1 | 5/2009 | Delurio et al. |
| 2011/0316508 | A1 | 12/2011 | Cheng et al. |
| 2013/0234678 | A1 | 9/2013 | Patterson et al. |
| 2014/0070787 | A1 | 3/2014 | Arno |
| 2014/0139198 | A1 | 5/2014 | Manlove et al. |
| 2014/0266120 | A1 * | 9/2014 | Isham ................. H02M 3/157 323/283 |
| 2015/0048811 | A1 | 2/2015 | Fayed et al. |
| 2015/0311787 | A1 * | 10/2015 | Maede ................. H02M 3/156 323/271 |
| 2016/0006336 | A1 * | 1/2016 | Bennett ............... H02M 3/156 323/271 |
| 2018/0120877 | A1 | 5/2018 | Zhao |
| 2019/0081546 | A1 * | 3/2019 | Hsu ..................... H02M 3/158 |
| 2020/0083798 | A1 | 3/2020 | Yazdi et al. |
| 2021/0296995 | A1 * | 9/2021 | Zhang ................. H02M 3/156 |
| 2022/0077779 | A1 | 3/2022 | Mao et al. |

FOREIGN PATENT DOCUMENTS

| | | |
|---|---|---|
| JP | 4829287 B2 | 9/2011 |
| JP | 2013021790 A | 1/2013 |
| KR | 101310092 B1 | 9/2013 |
| TW | I613537 B | 2/2018 |
| WO | WO-0186792 A1 | 11/2001 |
| WO | WO-2020053884 A1 | 3/2020 |

OTHER PUBLICATIONS

Liu, Pang-Jung, et al., "A Spur-Reduction DC-DC Converter With Active Ripple Cancelation Technique", IEEE Journal of Emerging and Selected Topics in Power Electronics, 6(4), (Dec. 2018), 2206-2214.

Nashed, Mina, et al., "Current-Mode Hysteretic Buck Converter With Spur-Free Control for Variable Switching Noise Mitigation", IEEE Transactions on Power Electronics, 33(1), (Jan. 2018), 650-664.

Pakala, Sri Harsh, et al., "A Spread-Spectrum Mode Enabled Ripple-Based Buck Converter Using a Clockless Frequency Control", IEEE Transactions on Circuits and Systems-II: Express Briefs, 66(3), (Mar. 2019), 382-386.

Tao, Chengwu, "Control architectures for spur-free operation in switching power regulators", PhD Diss., Iowa State University, (2011), 135 pgs.

Yang, Zhe, "A Mixed Signal Adaptive Ripple Cancellation Technique for Integrated Buck Converters", MS Thesis, Arizona State University, (Dec. 2016), 50 pgs.

* cited by examiner

US 11,742,741 B2

SPURIOUS NOISE REDUCTION BY MONOTONIC FREQUENCY STEPPING WITH COMPENSATION OF ERROR AMPLIFIER'S OUTPUT IN PEAK CURRENT MODE SWITCHING REGULATOR

CLAIMS OF PRIORITY

This patent application claims the benefit of priority U.S. Provisional Patent Application Ser. No. 63/075,667, titled "SPURIOUS NOISE REDUCTION BY MONOTONIC FREQUENCY STEPPING WITH COMPENSATION OF ERROR AMPLIFIER'S OUTPUT IN PEAK CURRENT MODE SWITCHING REGULATOR," filed on Sep. 8, 2020, which is hereby incorporated by reference herein in its entirety.

TECHNICAL FIELD

The present disclosure generally relates power management, particularly to switching regulators (also referred to as switched-mode power converters) with spurious noise reduction.

BACKGROUND

Some applications (e.g., RF applications) require its supply voltage to be low noise and low spur while providing high current to achieve high performance. Switching regulators are a type of power supply. Switching regulators can increase (e.g., boost converter) or decrease (e.g., buck converter) an input voltage from a power source to a desired voltage suitable for connected load devices. For example, switching regulators can include, among other things, two switches that alternatively turn on and off to generate an output voltage at the desired voltage level. The switching occurs at a switching frequency. But a switching regulator with a fixed switching frequency can lead to high spurs at the switching frequency and its harmonics, leading to low performance.

BRIEF DESCRIPTION OF THE DRAWINGS

Various ones of the appended drawings merely illustrate example embodiments of the present disclosure and should not be considered as limiting its scope.

DETAILED DESCRIPTION

Accordingly, the present inventor recognized, among other things, a need for a switching regulator that can provide a high current while operating with low noise and low spur. The switching regulator may operate with a varying switching frequency. Spurs at the varying switching frequency may be reduced by compensating an error amplifier, which controls the switching frequency.

The document describes a method for spur attenuation in a switching regulator. The method includes: receiving an input signal at a switching regulator, the switching regulator including a pair of switching devices; changing a switching frequency of the pair of switching devices; in response to changing the switching frequency, adjusting a compensation voltage by a delta value of the compensation voltage to stabilize the compensation voltage; and converting the input signal into an output voltage.

The document also describes a switching regulator circuit. The switching regulator circuit includes a pair of switching devices to receive an input voltage, an inductor coupled to the pair of switching devices, a capacitor coupled to the inductor, defining an output node for an output voltage, and a control circuit. The control circuit includes an error amplifier and a summing node to subtract a delta value from an output of the error amplifier generating a compensation voltage. Based on the compensation voltage, the control circuit can adjust a switching frequency of the pair of switching devices.

The document further describes a control circuit to reduce spurs in a switching regulator. The control circuit includes an error amplifier to receive an output voltage of the switching regulator, a summing node to subtract a delta value from an output of the error amplifier generating a compensation voltage, and a logic circuit to, based on the compensation voltage, generate a control signal to adjust a switching frequency of a pair of switching devices in the switching regulator.

Figure 1:
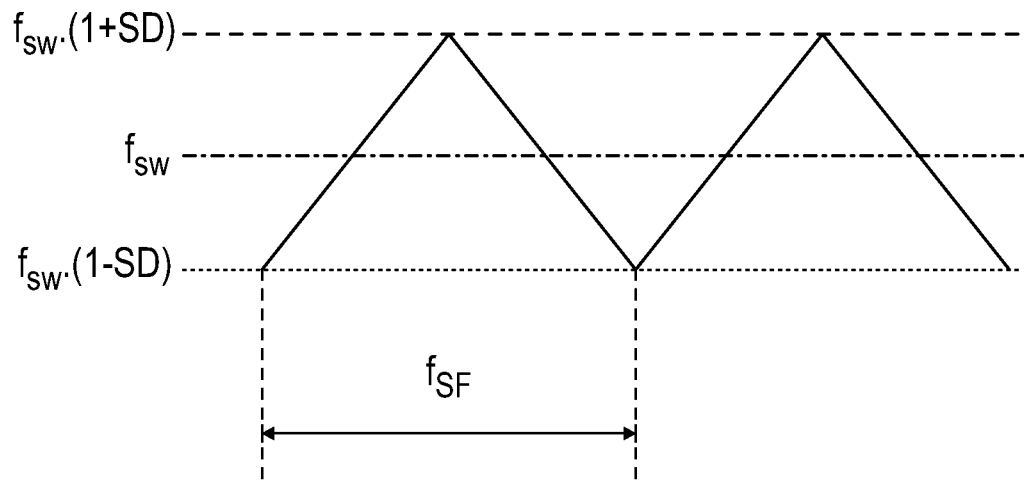
FIG. 1 illustrates a spread spectrum with triangle waveform associated with a switching regulator.

FIG. 1 illustrates a spread spectrum with triangle waveform associated with a switching regulator. The triangle waveform may have a switching frequency ($f_{SW}$) and a sweep frequency ($f_{SF}$). Varying the switching frequency ($f_{SW}$) monotonically and periodically may reduce the spur seen at the switching frequency ($f_{SW}$). But that reduction may come at the cost of increasing the spur at the sweep frequency ($f_{SF}$) for peak current mode of a switching regulator. That is because, for a peak current mode switching regulator, two negative loops are provided: 1) a current loop to regulate coil current equal to a load current, and 2) a voltage loop to regulate an output voltage, $V_{OUT}$, to a reference. When the switching frequency ($f_{SW}$) changes and if the load current is constant, the voltage loop may change a compensation voltage (Vcomp) to regulate the coil current. Since $V_{OUT}$ is in the voltage loop, $V_{OUT}$ is modulated with the sweep frequency. Thus, the spur at the sweep frequency ($f_{SF}$) may be induced.

This spur may be reduced by compensating Vcomp by ΔVcomp in response to switching frequency ($f_{SW}$) changes, as described herein. Thus, the voltage loop may not change to Vcomp, and therefore $V_{OUT}$ may not be modulated with the sweep frequency ($f_{SF}$). As a result, the spur at the sweep frequency ($f_{SF}$) may be reduced or eliminated.

Figure 2:
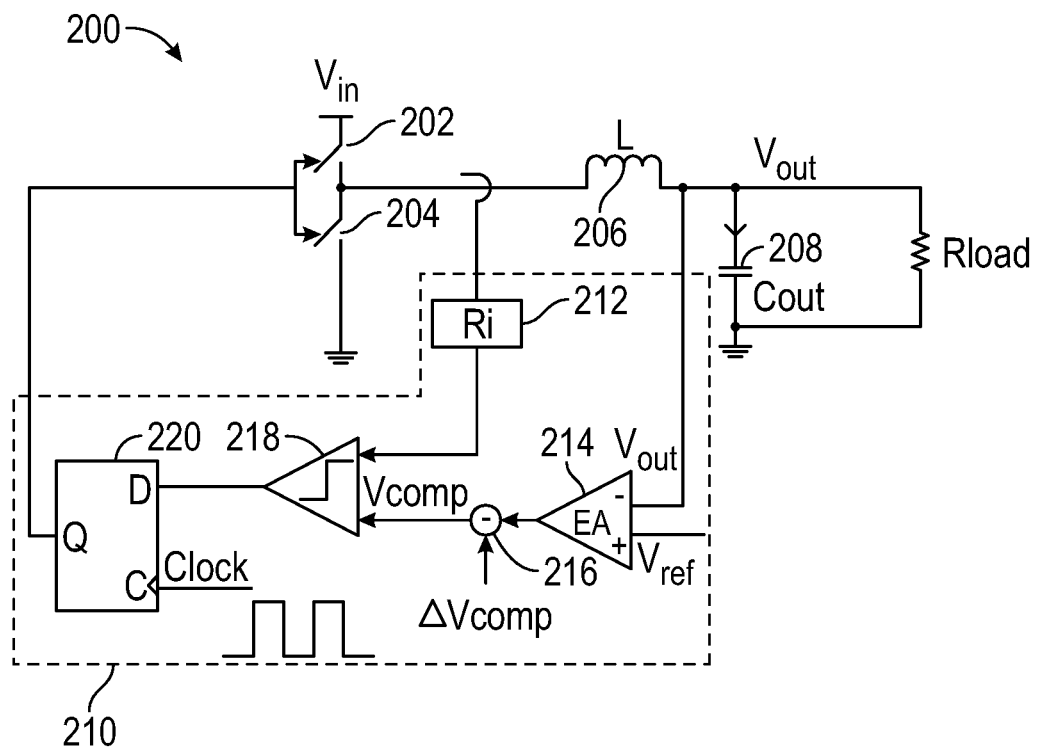
FIG. 2 illustrates example portions of a switching regulator.

FIG. 2 illustrates example portions of a switching regulator 200. The switching regulator 200 may include a pair of switching devices 202, 204, an inductor 206 (L), and a capacitor 208 (Cout). The switching regulator 200 may also include a control circuit 210 to control the switching frequency (e.g., duty cycle) of the switching devices 202, 204. The control circuit 210 may include a resistor 212 (Ri), an error amplifier 214, a summing node 216, a comparator 218, and one or more logic circuits 220 (e.g., D flip flop).

The switching devices 202, 204 may be provided as N channel field-effect transistors ("FETs"), as P channel FETs, a metal-oxide-semiconductor FET (MOSFET), or a combination, or the like. Input voltage $V_{IN}$ may be applied to an input terminal of the switching device 202. $V_{IN}$ may be a voltage at the first voltage level. The output of switching device 202 may be coupled to the inductor L 106 and the switching device 204, which may also be coupled to ground. The inductor L 206 may be coupled to the capacitor 208, defining an output node for the output voltage $V_{OUT}$ (Rload is also provided as load resistor at the output node).

The timing of the switching devices 202, 204 may be controlled by the control circuit 210 as described in more detail below. The control circuit 210 may alternately turn on and off the switching devices 202, 204. For example, the control circuit 210 may output a pulse width modulation signal to control when the switching device 202 turns on and off. The control circuit 210 may invert that pulse width modulation signal so that the switching device 204 is turned on and off at opposite times as switching device 202. In other words, when the switching device 202 is on, the switching device 204 is off and vice versa. The rapid on/off duty cycles of switching devices 202, 204 may be used to control the value of $V_{OUT}$. The switching devices 202, 204 may be provided as a complementary pair of transistor devices, for example the switching device 202 may be provided as a P channel. FET while the switching device 204 may be provided as a N channel FET, in which case the control circuit 210 may not need invert the control signal to alternate the timing of the switching devices.

The switching devices 202, 204 may generate a waveform and may be coupled to the inductor L 206. A coil current Icoil may flow through the inductor L 106. The inductor L 206 may be coupled to the capacitor (Cout) 208, defining the output node for the output voltage $V_{OUT}$ The control circuit 210 may be coupled to the inductor L 206. The error amplifier may receive $V_{OUT}$ and a reference voltage $V_{REF}$ as inputs. The error amplifier 214 may amplify $V_{OUT}$ using the reference voltage $V_{REF}$. The output of the error amplifier 214 may be coupled to the summing node 216, the output of which is Vcomp. ΔVcomp may be coupled to the summing node 216 as a negative input. Thus, the Vcomp may be the difference of the output of the error amplifier and ΔVcomp.

The output of the summing node 216 may be coupled to the comparator 218, which may also be coupled to the resistor 212. The comparator 218 may compare Vcomp and Vcoil (Icoil*Ri). The output of the comparator 216 may be provided as an input to the logic gate 220. Based on the output of the comparator 218 and a clock signal, the duty cycle (switching frequency) may be set ley the logic gate 220 (e.g., D flip flop).

Figure 3:
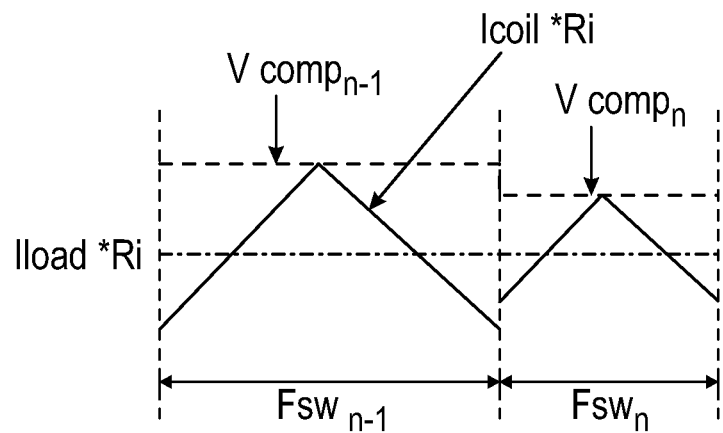
FIG. 3 illustrates example waveforms for the compensation voltage and the switching frequency.

FIG. 3 illustrates the relationship of Vcomp change caused by changes in the switching frequency. When switching frequency ($f_{SW}$) changes (e.g., from fSW(n−1) to fSW (n), ΔVcomp may change by ΔVcomp(n). Then, as discussed above, ΔVcomp may be subtracted from the output of the error amplifier.

ΔVcomp may be defined as:

$$\Delta Vcomp_n = \frac{Vin - Vout}{2L} * D * Ri * \left(\frac{1}{fsw_n} - \frac{1}{fsw_{n-1}}\right)$$

$$\Delta Vcomp = \Delta Vcomp_0 + \Delta Vcomp_1 + \ldots + \Delta Vcompn$$

Figure 4:
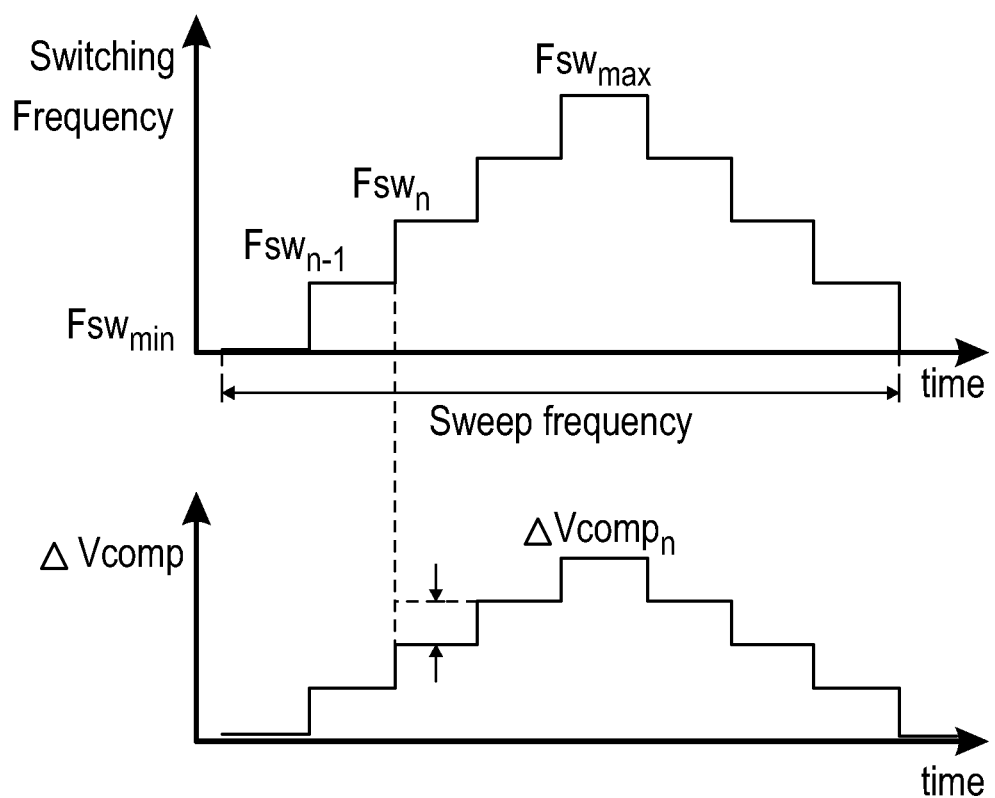
FIG. 4 illustrates example waveforms for delta compensation voltage and switching frequency.
Figure 5:
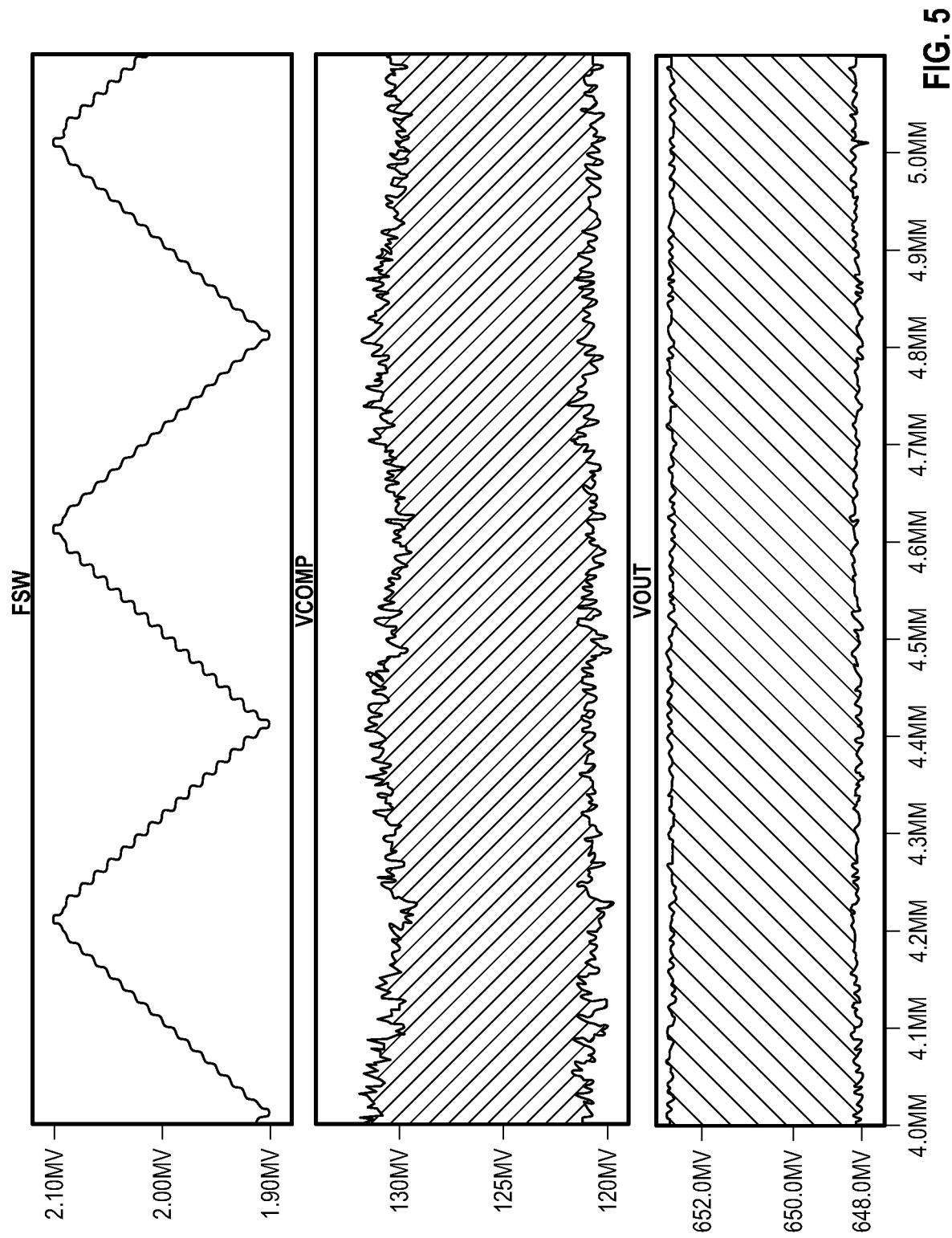
FIG. 5 illustrates example waveforms for the switching frequency, the compensation voltage, and output voltage.

FIG. 4 illustrates the relationship of ΔVcomp and switching frequency ($f_{SW}$). FIG. 5 illustrates example waveforms of switching frequency ($f_{SW}$), Vcomp, and Vout using the techniques described herein. As shown, Vcomp may be stabilized based on the continuous ΔVcomp adjustments, as described herein. This may lead to reducing or eliminating low frequency spurs.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B hut not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

The invention claimed is:

1. A method for spur attenuation in a switching regulator, the method comprising:
   receiving an input signal at a switching regulator, the switching regulator including a pair of switching devices;
   converting the input signal into an output voltage at a first time based on a compensation voltage;
   changing a switching frequency of the pair of switching devices;
   in response to changing the switching frequency, adjusting the compensation voltage by:
      amplifying the output voltage at the first time with a reference voltage generating an error amplifier output, and
      subtracting a delta value of the compensation voltage based on the compensation voltage at the first time and a second time from the error amplifier to stabilize the adjusted compensation voltage; and
   converting the input signal into the output voltage at the second time based on the adjusted compensation voltage.

2. The method of claim 1, further comprising:
   changing the switching frequency based on the adjusted compensation voltage.

3. The method of claim 1, further comprising:
   comparing adjusted compensation voltage and a coil voltage; and
   based on comparing the adjusted compensation voltage and the coil voltage, changing the switching frequency.

4. The method of claim 3, wherein the coil voltage is associated with an inductor of the switching regulator.

5. The method of claim 1, wherein adjusting the compensation voltage is performed continuously.

6. A switching regulator circuit, comprising:
   a pair of switching devices to receive an input voltage and to generate an output voltage at a first time based on a compensation voltage;
   an inductor coupled to the pair of switching devices;
   a capacitor coupled to the inductor, defining an output node for an output voltage; and
   a control circuit including
      an error amplifier to amplify the output voltage at the first time with a reference voltage, and
      a summing node to subtract a delta value of the compensation voltage at the first time and a second time from an output of the error amplifier generating an adjusted compensation voltage,
      wherein based on the compensation voltage, the control circuit to adjust a switching frequency of the pair of switching devices,
      wherein the pair of switching devices to convert input voltage into the output voltage at the second time based on the adjusted compensation voltage.

7. The switching regulator circuit of claim 6, further comprising:
   a comparator to compare the compensation voltage and a coil voltage of the inductor.

8. The switching regulator circuit of claim 7, further comprising:
   a resistor to generate the coil voltage.

9. The switching regulator circuit of claim 6, wherein a logic gate controls adjusting the switching frequency.

10. The switching regulator circuit of claim 9, wherein the logic gate is a D flip flop.

11. The switching regulator circuit of claim 9, wherein the logic gate receives a clock input.

12. The switching regulator circuit of claim 6, wherein the compensation voltage is adjusted in response to changes in the switching frequency.

13. A control circuit to reduce spurs in a switching regulator, the control circuit comprising:
   an error amplifier to receive an output voltage of the switching regulator and to amply the output voltage at a first time with a reference voltage;
   a summing node to subtract a delta value of the compensation voltage at the first time and a second time from an output of the error amplifier generating an adjusted compensation voltage; and
   a logic circuit to, based on the compensation voltage, generate a control signal to adjust a switching frequency of a pair of switching devices in the switching regulator and to control the switching regulator to convert an input voltage to the output voltage at the second time based on the adjusted compensation voltage.

14. The control circuit of claim 13, further comprising:
   a comparator to compare the compensation voltage and a coil voltage associated with an inductor of the switching regulator.

15. The control circuit of claim 14, further comprising:
   a resistor to generate the coil voltage.

16. The control circuit of claim 13, wherein the logic circuit is a D flip flop.

17. The control circuit of claim 13, wherein the logic circuit receives a clock input.

18. The control circuit of claim 13, wherein the compensation voltage is adjusted in response to changes in the switching frequency.

19. The control circuit of claim 13, wherein the compensation voltage is adjusted in a feedback loop.

* * * * *